(12) United States Patent
Iwaki et al.

(10) Patent No.: US 12,028,352 B2
(45) Date of Patent: Jul. 2, 2024

(54) LEARNING METHOD, LEARNING DEVICE, AND LEARNING PROGRAM

(71) Applicant: NIPPON TELEGRAPH AND TELEPHONE CORPORATION, Tokyo (JP)

(72) Inventors: Yuta Iwaki, Musashino (JP); Shingo Orihara, Musashino (JP); Kunio Miyamoto, Musashino (JP); Yo Kanemoto, Musashino (JP); Yuichi Murata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 773 days.

(21) Appl. No.: 17/056,432

(22) PCT Filed: Apr. 16, 2019

(86) PCT No.: PCT/JP2019/016386
§ 371 (c)(1),
(2) Date: Nov. 18, 2020

(87) PCT Pub. No.: WO2019/225228
PCT Pub. Date: Nov. 28, 2019

(65) Prior Publication Data
US 2021/0203677 A1    Jul. 1, 2021

(30) Foreign Application Priority Data

May 21, 2018 (JP) ................................ 2018-097451

(51) Int. Cl.
*H04L 9/40*   (2022.01)
*G06N 20/00*  (2019.01)

(52) U.S. Cl.
CPC ......... *H04L 63/1416* (2013.01); *G06N 20/00* (2019.01)

(58) Field of Classification Search
CPC ... H04L 63/1416; G06N 20/00; G06F 21/552; G06F 21/554
See application file for complete search history.

(56) References Cited

U.S. PATENT DOCUMENTS 11,106,994 B1 *   8/2021   Batalov ................... G06N 5/04
2013/0204825 A1 * 8/2013   Su ........................... G06N 5/02
                                                                706/46

(Continued)

FOREIGN PATENT DOCUMENTS

WO     2015/186662 A1    12/2015

*Primary Examiner* — Bruce S Ashley
(74) *Attorney, Agent, or Firm* — XSENSUS LLP

(57) ABSTRACT

A learning device generates a character class series abstracting a structure of a predetermined character string included in each of requests to the server which have been generated in a predetermined period. Also, for each of the combinations of the predetermined identification information and the character class series included in the requests, the learning device calculates a score for update which becomes higher as the number of times of appearance of the combination is increased and becomes higher as the appearance of the combination is continued. Based on the score for update, the learning device updates the profile of each combination for determining whether the request is an attack or not.

6 Claims, 22 Drawing Sheets

(56) References Cited

U.S. PATENT DOCUMENTS

| | | | |
|---|---|---|---|
| 2015/0373043 A1* | 12/2015 | Wang | G06F 21/6254 |
| | | | 706/12 |
| 2017/0031741 A1* | 2/2017 | Seigel | G06F 11/0709 |
| 2017/0126724 A1 | 5/2017 | Zhong et al. | |
| 2018/0255094 A1* | 9/2018 | Doron | H04L 63/1458 |
| 2018/0295154 A1* | 10/2018 | Crabtree | H04L 63/1433 |

* cited by examiner

FIG.3

| | NUMBER OF TIMES OF APPEARANCE | | | | | | TOTAL | CORRECTION VALUE OF NUMBER OF TIMES OF APPEARANCE |
|---|---|---|---|---|---|---|---|---|
| | 0:00 TO 4:00 | 4:00 TO 8:00 | 8:00 TO 12:00 | 12:00 TO 16:00 | 16:00 TO 20:00 | 20:00 TO 24:00 | | |
| COMBINATION A | 0 | 5 | 45 | 30 | 10 | 0 | 90 | 90×4/6=60 |
| COMBINATION B | 0 | 0 | 120 | 0 | 0 | 0 | 120 | 120×1/6=20 |

RATIO OF THE NUMBER OF TIME BLOCKS HAVING THE NUMBER OF TIMES OF APPEARANCE OF 1 OR MORE IS 1/6

RATIO OF THE NUMBER OF TIME BLOCKS HAVING THE NUMBER OF TIMES OF APPEARANCE OF 1 OR MORE IS 4/6

FIG.6

TEMPORARY DATA FOR PROFILE OUTPUT

| PATH | KEY | CHARACTER CLASS SERIES | NUMBER OF TIMES OF APPEARANCE | STATUS |
|---|---|---|---|---|
| path1 | param1 | CHARACTER CLASS SERIES 1 | 40 | VALID |
| path1 | param1 | CHARACTER CLASS SERIES 2 | 30 | VALID |
| path1 | param1 | CHARACTER CLASS SERIES 3 | 0 | INVALID |
| ... | ... | ... | ... | ... |

LEARNING DATA

| PATH | KEY | CHARACTER CLASS SERIES | NUMBER OF TIMES OF APPEARANCE |
|---|---|---|---|
| path1 | param1 | CHARACTER CLASS SERIES 2 | 30 |
| path1 | param1 | CHARACTER CLASS SERIES 3 | 0 |
| path2 | param2 | CHARACTER CLASS SERIES 4 | 60 |
| ... | ... | ... | ... |

PATH, KEY, AND CHARACTER CLASS SERIES PRESENT ONLY IN LEARNING DATA

ADD THE INFORMATION OF LEARNING DATA TO TEMPORARY DATA FOR PROFILE OUTPUT

TEMPORARY DATA FOR PROFILE OUTPUT

| PATH | KEY | CHARACTER CLASS SERIES | NUMBER OF TIMES OF APPEARANCE | STATUS |
|---|---|---|---|---|
| path1 | param1 | CHARACTER CLASS SERIES 1 | 40 | VALID |
| path1 | param1 | CHARACTER CLASS SERIES 2 | 30 | SEMI-INVALID |
| path1 | param1 | CHARACTER CLASS SERIES 3 | 0 | INVALID |
| path2 | param2 | CHARACTER CLASS SERIES 4 | 60 | |

FIG.7

TEMPORARY DATA FOR PROFILE OUTPUT

| PATH | KEY | CHARACTER CLASS SERIES | NUMBER OF TIMES OF APPEARANCE | STATUS |
|---|---|---|---|---|
| path1 | param1 | CHARACTER CLASS SERIES 1 | 40 | VALID |
| path1 | param1 | CHARACTER CLASS SERIES 2 | 30 | SEMI-INVALID |
| path1 | param1 | CHARACTER CLASS SERIES 3 | 10 | INVALID |
| path2 | param2 | CHARACTER CLASS SERIES 4 | 60 | |
| ... | ... | ... | ... | ... |
| path3 | param3 | CHARACTER CLASS SERIES 5 | 20 | SEMI-INVALID |
| path3 | param3 | CHARACTER CLASS SERIES 6 | 35 | INVALID |
| ... | ... | ... | ... | ... |

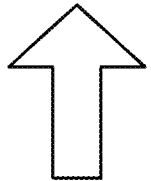

| NUMBER OF TIMES OF APPEARANCE | STATUS |
|---|---|
| 40 | VALID |
| 30 | VALID |
| 0 | INVALID |
| 0 | INVALID |
| ... | ... |
| 0 | SEMI-INVALID |
| 0 | SEMI-INVALID |
| ... | ... |

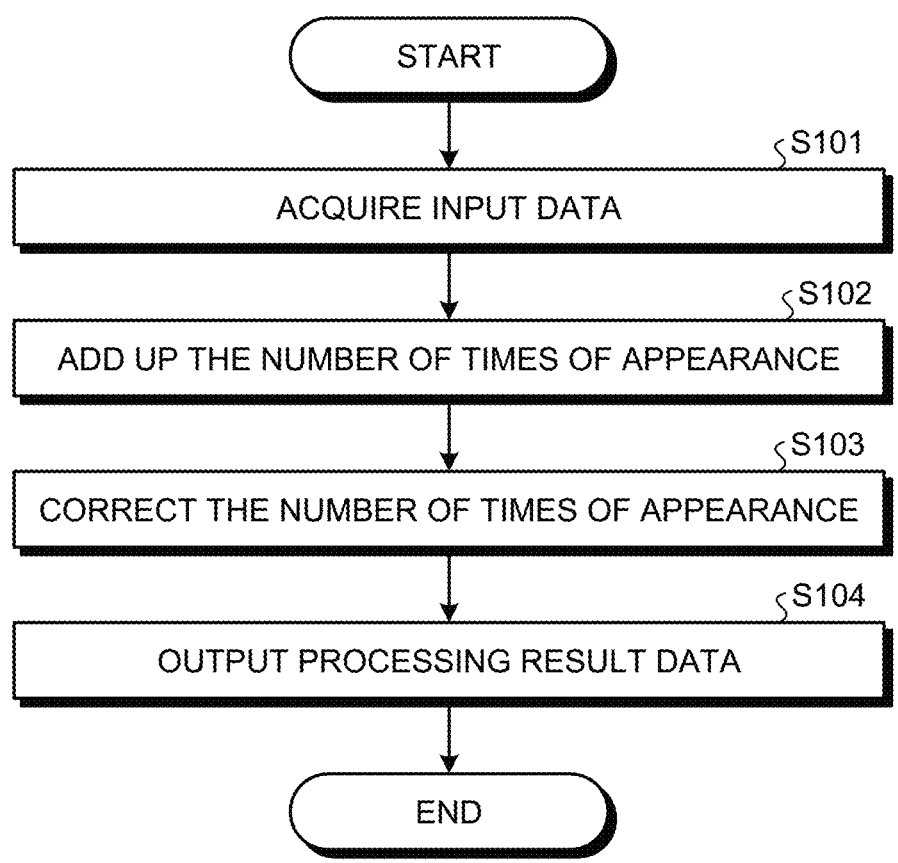

TEMPORARY DATA FOR PROFILE OUTPUT

| PATH | KEY | CHARACTER CLASS SERIES | NUMBER OF TIMES OF APPEARANCE | STATUS | NUMBER OF TIMES OF APPEARANCE LEARNING |
|---|---|---|---|---|---|
| pathA | paramA | CHARACTER CLASS SERIES A | 105 | SEMI-INVALID | 5 |
| pathA | paramA | CHARACTER CLASS SERIES B | 40 | INVALID | 1 |
| pathA | paramA | CHARACTER CLASS SERIES C | 30 | | 1 |
| ... | ... | ... | ... | ... | ... |

| NUMBER OF TIMES OF APPEARANCE (AFTER CORRECTION) |
|---|
| 105×(5/(6+1))=75 |
| 40×(1/(6+1))=5 |
| 30×(1/(6+1))=4 |
| ... |

FIG.19

TEMPORARY DATA FOR PROFILE OUTPUT

| PATH | KEY | CHARACTER CLASS SERIES | NUMBER OF TIMES OF APPEARANCE | STATUS | FINAL LEARNING DATA APPEARANCE DATE |
|---|---|---|---|---|---|
| pathA | paramA | CHARACTER CLASS SERIES A | 105 | VALID | 2017/12/22 |
| pathA | paramA | CHARACTER CLASS SERIES B | 40 | VALID | 2016/12/22 |
| pathA | paramA | CHARACTER CLASS SERIES C | 30 | ... | 2017/12/22 |
| ... | ... | ... | ... | ... | ... |

↓

| NUMBER OF TIMES OF APPEARANCE | STATUS |
|---|---|
| 105 | VALID |
| 0 | INVALID |
| 0 | INVALID |
| ... | ... |

SINCE DATE IS BEFORE CURRENT YEAR, MONTH, DATE (FOR EXAMPLE:2017/12/22) BY THE NUMBER OF DAYS DETERMINED IN ADVANCE (FOR EXAMPLE:365 DAYS), STATUS IS SET TO "INVALID", AND NUMBER OF TIMES OF APPEARANCE IS RESET TO "0"

TEMPORARY DATA FOR PROFILE OUTPUT

| PATH | KEY | CHARACTER CLASS SERIES | NUMBER OF TIMES OF APPEARANCE | STATUS |
|---|---|---|---|---|
| pathA | paramA | CHARACTER CLASS SERIES A | 60 | |
| pathA | paramA | CHARACTER CLASS SERIES B | 20 | |
| ... | ... | ... | ... | ... |

| | NUMBER OF TIMES OF APPEARANCE | STATUS |
|---|---|---|
| | 60 | VALID |
| | 0 | INVALID |
| | ... | ... |

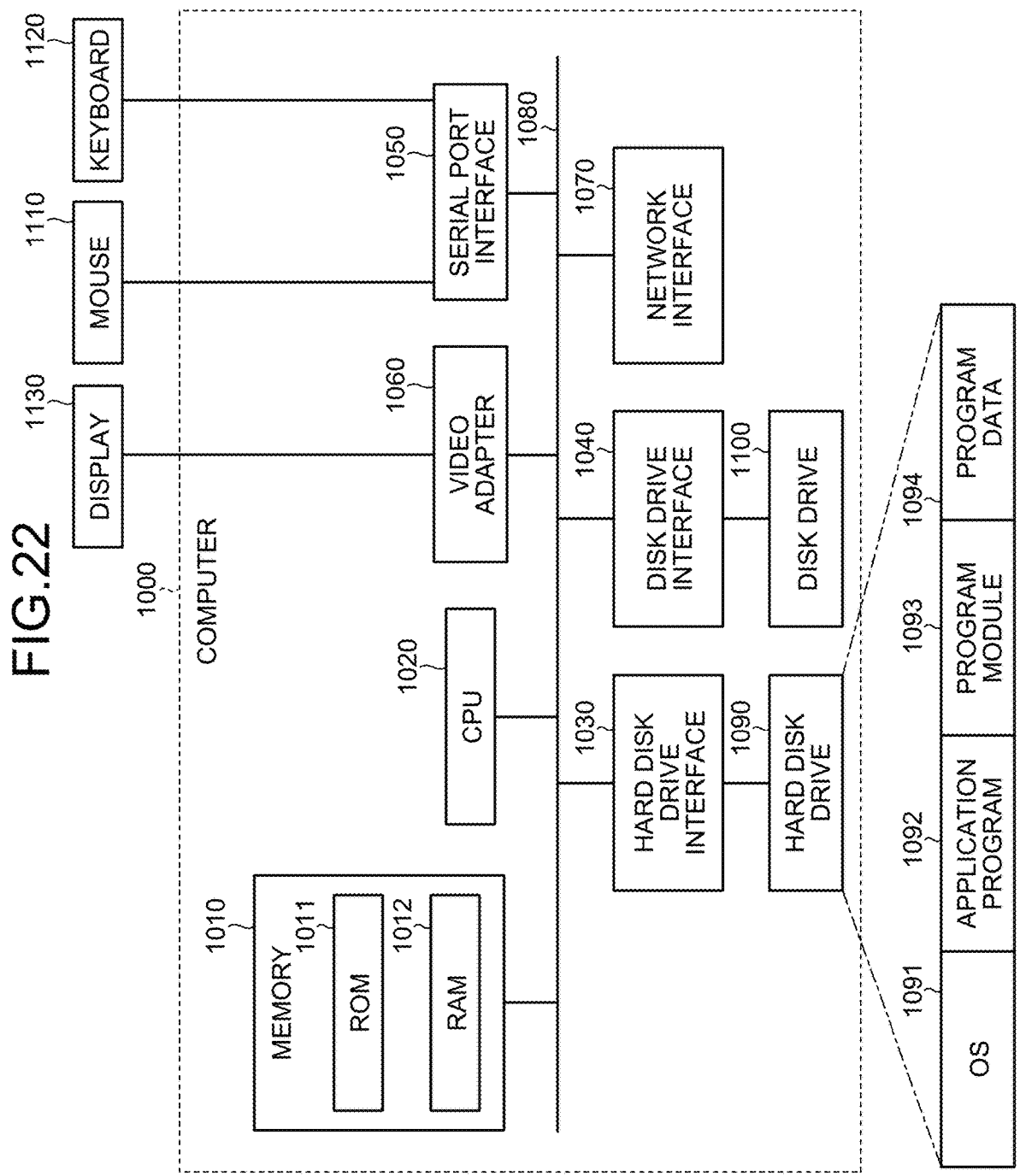

LEARNING METHOD, LEARNING DEVICE, AND LEARNING PROGRAM

CROSS-REFERENCE TO RELATED APPLICATIONS

The present application is based on PCT filing PCT/JP2019/016386, filed Apr. 16, 2019, which claims priority to JP 2018-097451, filed May 21, 2018, the entire contents of each are incorporated herein by reference.

FIELD

The present invention relates to a learning method, a learning device, and a learning program.

BACKGROUND

As the Internet has become common, attacks on Web servers have been rapidly increasing. As countermeasures against the attacks, for example, an intrusion detection system (IDS), an intrusion prevention system (IPS), and a web application firewall (WAF) are known. In these techniques, detection is carried out with patterns using blacklists and signature files to carry out detection of and protection from known attacks.

Also, as a technique to detect unknown attacks, there is known a technique that learns profiles by using features extracted from predetermined values included in normal requests to a Web server to determine whether requests, which are analysis subjects, are attacks or not by using the profiles (for example, see Patent Literature 1).

CITATION LIST

Patent Literature

Patent Literature 1: WO 2015/186662 A

SUMMARY

Technical Problem

However, the conventional techniques have a problem that it is sometimes difficult to appropriately carry out learning of the profiles for detecting attacks. Note that the conventional techniques carry out learning and determination based on the knowledge that normal requests have higher appearance frequencies compared with the requests made by attacks.

For example, in the techniques described in Cited Literature 1, the features at a predetermined rank or higher of the number of times of appearance are sometimes selected as subjects of learning. In such cases, the features extracted from the requests having a sufficient number of times of appearance, but at a low rank of the number of times of appearance cannot be used as subjects of learning. When the requests including these features are to be analyzed, erroneous detection is caused as a result.

Also, it is conceivable to simply select the features having a large number of times of appearance as subjects of learning. On the other hand, the requests made by attacks are sometimes generated in a massive amount in a short period of time. In such a case, if learning of a profile is carried out by using the features simply having a large number of times of appearance, the features of the requests made by attacks are also learned, and missing of detection occurs when the requests including these features are analyzed.

Solution to Problem

To solve a problem and to achieve an object, a learning method executed by a computer, the learning method includes: a generation process of generating a character class series abstracting a structure of a predetermined character string included in a request to a server generated in a predetermined period; a calculation process of calculating, for each combination of predetermined identification information and the character class series included in the request, a score for update so that the score becomes higher as the number of times of appearance of the combination is increased and that the score becomes higher as appearance of the combination continues; and an update process of updating a profile of each of the combination for determining whether the request is an attack or not based on the score for update.

Advantageous Effects of Invention

According to the present invention, a profile for detecting attacks can be appropriately learned.

BRIEF DESCRIPTION OF DRAWINGS

FIG. 3 is a diagram for describing a calculating processing of the learning device according to the first embodiment.

FIG. 6 is a diagram for describing an updating processing of the profile according to the first embodiment.

FIG. 7 is a diagram for describing an updating processing of the profile according to the first embodiment.

FIG. 8 is a flow chart illustrating a flow of a calculating processing of the learning device according to the first embodiment.

FIG. 19 is a diagram for describing an updating processing of the profile according to the third embodiment.

FIG. 22 is a diagram illustrating an example of a computer which executes the learning program according to the embodiment.

DESCRIPTION OF EMBODIMENTS

Hereinafter, embodiments of a learning method, a learning device, and a learning program according to the present application will be described in detail based on drawings. Note that the present invention is not limited by the embodiments described below.

Configuration of First Embodiment

Figure 1:
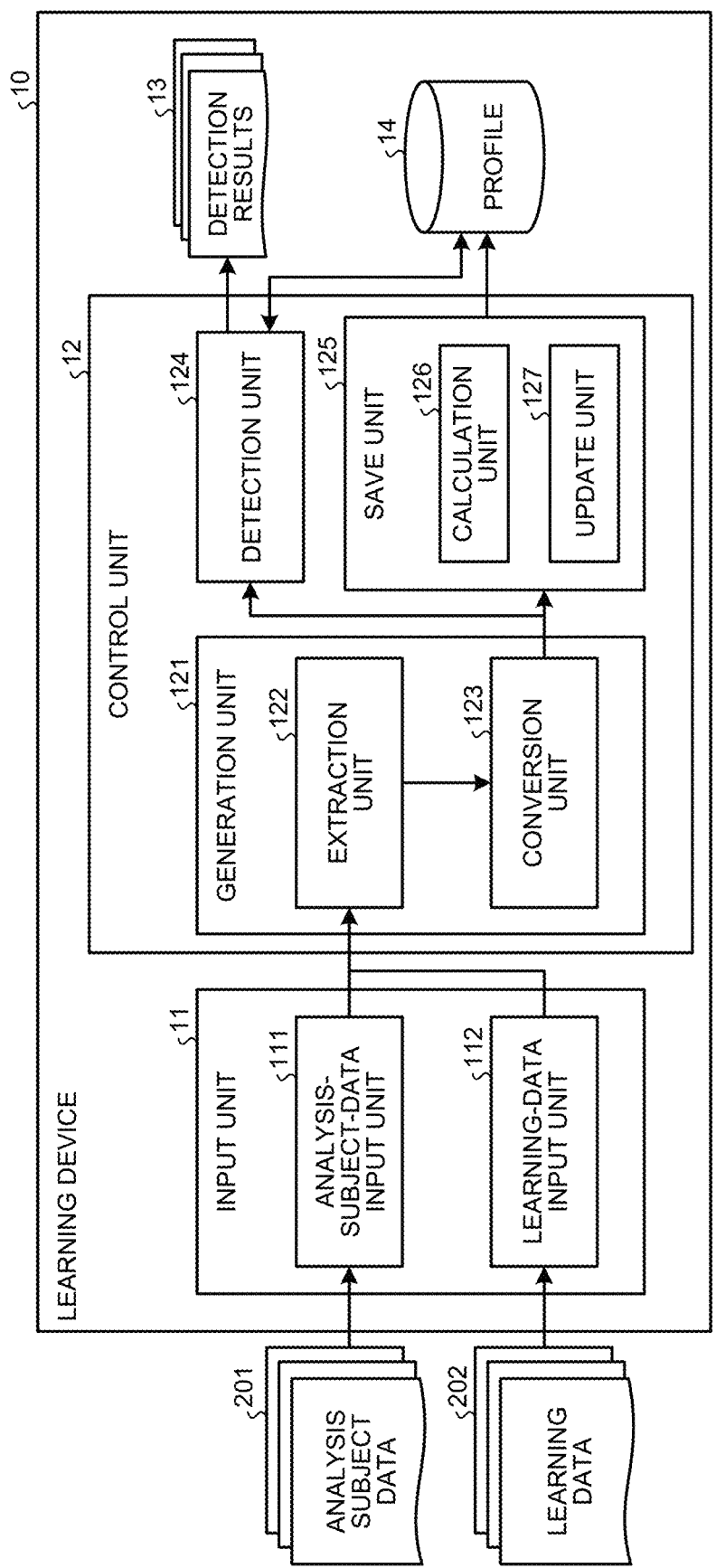
FIG. 1 is a diagram illustrating an example of a configuration of a learning device according to a first embodiment.

First, a configuration of a learning device according to a first embodiment will be described with reference to FIG. 1. FIG. 1 is a diagram illustrating an example of the configuration of the learning device according to the first embodiment. Based on similarity with requests to a server, a learning device 10 carries out learning of a profile 14, which is for determining whether the requests are attacks or not. Also, the learning device 10 detects requests, which are attacks, by using the profile 14. As illustrated in FIG. 1, the learning device 10 has an input unit 11 and a control unit 12 and stores detection results 13 and the profile 14.

The input unit 11 receives input of data for learning or analysis in the learning device 10. The input unit 11 has an analysis-subject-data input unit 111 and a learning-data input unit 112. The analysis-subject-data input unit 111 receives input of analysis subject data 201. Also, the learning-data input unit 112 receives input of learning data 202.

Herein, the analysis subject data 201 and the learning data 202 is, for example, HTTP requests generated in access to Web sites. Also, the learning data 202 may be HTTP requests which have already been found out to be attacks or not.

The control unit 12 has a generation unit 121, a detection unit 124, and a save unit 125. Also, the generation unit 121 has an extraction unit 122 and a conversion unit 123. Also, the save unit 125 has a calculation unit 126 and an update unit 127.

The generation unit 121 generates a character class series abstracting the structure of a predetermined character string included in requests to the server. Herein, the request to the server is assumed to be a HTTP request. Hereinafter, a simple description, "request" is assumed to include a HTTP request. The generation unit 121 generates the character class series by processing in the extraction unit 122 and a conversion unit 123.

The extraction unit 122 extracts parameters from the analysis subject data 201 and the learning data 202 input to the input unit 11. Specifically, the extraction unit 122 extracts a path, keys of parameters, and values corresponding to the keys from each HTTP request. Herein, the values are examples of predetermined character strings.

For example, if the learning data 202 includes a URL "http://example.com/index.php?id=03&file=Top001.png", the extraction unit 122 extracts "index.php" as a path, extracts "id" and "file" as keys, and extracts "03" and "Top001.png" as the values corresponding to the keys.

Also, the conversion unit 123 converts the values, which have been extracted by the extraction unit 122, to a character class series. For example, the conversion unit 123 converts "03" and "Top001.png", which are the values extracted by the extraction unit 122, to character class series.

The conversion unit 123 carries out the conversion to the character class series, for example, by replacing a part of the values including a number by "numeric", replacing a part including an alphabet by "alpha", and replacing a part including a symbol by "symbol". The conversion unit 123 converts, for example, the value "03" to a character class series "(numeric)". Also, the conversion unit 123 converts, for example, the value "Top001.png" to a character class series "(alpha, numeric, symbol, alpha)".

The detection unit 124 collates combinations of predetermined identification information and character class series, which are included in the requests for analysis among requests, with the profile 14 to detect abnormalities. Also, in the present embodiment, the predetermined identification information is a combination of a path and a key extracted by the extraction unit 122.

Specifically, the detection unit 124 detects an attack, for example, by calculating the similarity between the profile 14 and the path, the key, and the character class series received from, for example, the conversion unit 123 and comparing the calculated similarity with a threshold value. For example, if the similarity between the profile 14 and the path, the key, and the character class series of certain analysis subject data 201 is equal to or less than the threshold value, the detection unit 124 detects the analysis subject data 201 as an attack. Also, the detection unit 124 outputs the detection results 13.

The save unit 125 saves the appearance frequency of each combination of the predetermined identification information and the character class series, which are included in the requests for learning among the requests, as the profile 14. Specifically, the save unit 125 saves the appearance frequencies of the paths, the keys, and the character class series, which have been received from the conversion unit 123, as the profile 14. Also, in this process, regarding each character class series corresponding to the path and the key, the status of the character class series determined based on the appearance frequency thereof is also saved as the profile 14.

Also, the calculation unit 126 calculates the appearance frequency, which is to be saved in the profile 14, based on the number of times of appearance of the combination of the path, the key, and the character class series. Also, the update unit 127 updates the profile 14 based on the appearance frequency calculated by the calculation unit 126. Detailed processing contents of the calculation unit 126 and the update unit 127 will be described later. Note that updating the profile 14 is synonymous with saving predetermined data as the profile 14.

Figure 2:
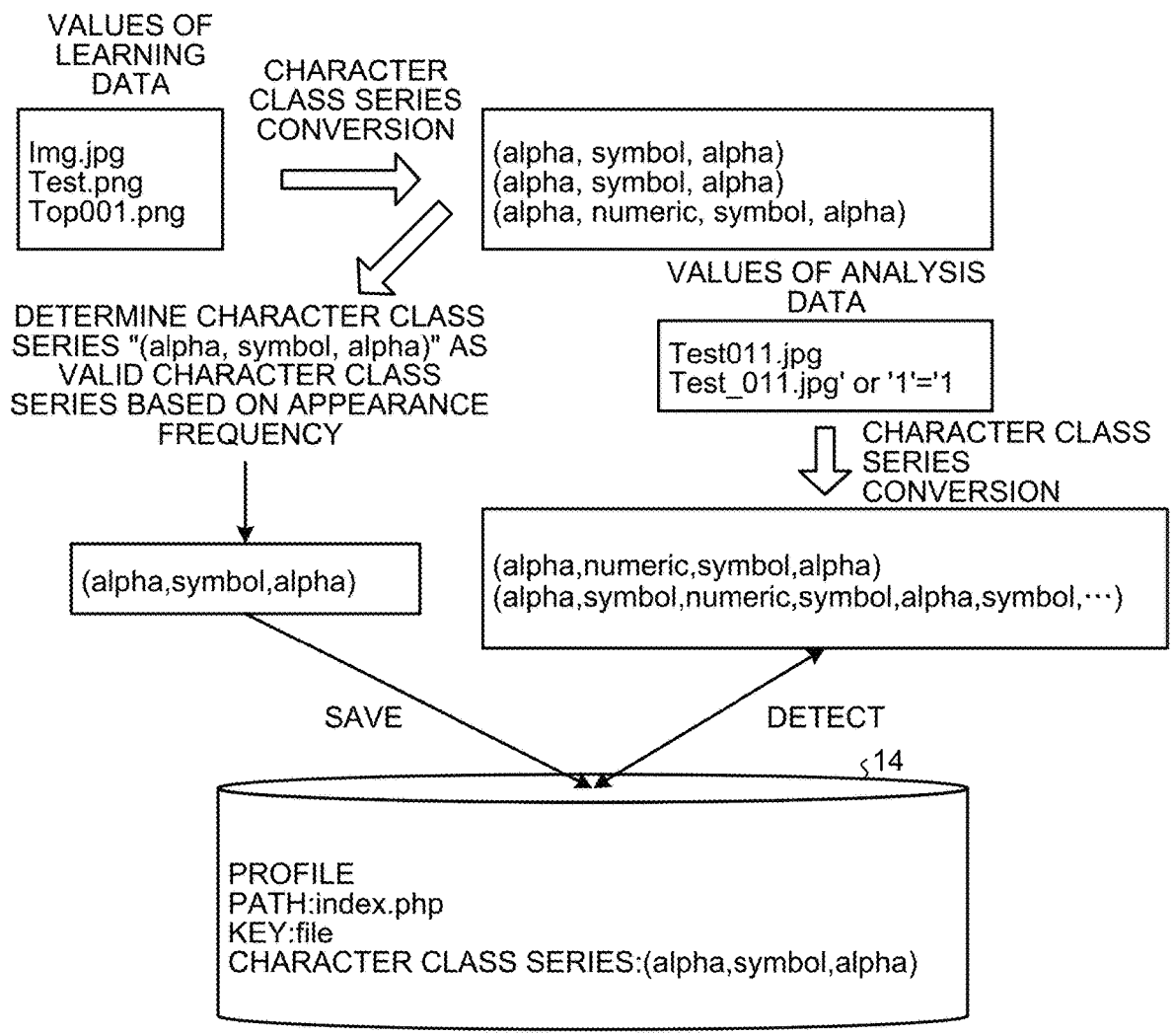
FIG. 2 is a diagram for describing a learning processing and a detecting processing according to the first embodiment.

Herein, a learning processing and a detecting processing carried out by the learning device 10 will be described by using FIG. 2. FIG. 2 is a diagram for describing the learning processing and the detecting processing according to the first embodiment.

First, the learning data 202 is assumed to include URLs "http://example.com/index.php?file=Img.jpg", "http://example.com/index.php?file=Test.png", and "http://example.com/index.php?file=Top001.png". Also, the analysis subject data 201 is assumed to include URLs "http://example.com/index.php?file=Test011.jpg" and "http://example.com/index.php?file=Test_011.jpg' or '1'='1'".

In this process, the extraction unit 122 extracts values "Img.jpg", "Test.png", and "Top001.png" from the learning data 202. Also, the extraction unit 122 extracts values "Test011.jpg" and "Test_011.jpg' or '1'='1'" from the analysis subject data 201.

Then, as illustrated in FIG. 2, the conversion unit 123 converts the values "Img.jpg", "Test.png", and "Top001.png" to character class series "(alpha, symbol, alpha)", "(alpha, symbol, alpha)", and "(alpha, numeric, symbol, alpha)", respectively.

Also, the conversion unit 123 converts the values "Test011.jpg" and "Test_011.jpg' or '1'='1'" to character class series "(alpha, numeric, symbol, alpha)" and "(alpha, symbol, numeric, symbol, alpha, symbol, space, alpha, space, symbol, numeric, symbol, numeric)", respectively.

Herein, it is assumed that "alpha" is a character class representing all alphabetic characters, "numeric" is a character class representing all numbers, "symbol" is a character class representing all symbols, and "space" is a character class representing blank characters. It is assumed that the definitions of the character classes are provided in advance, and character classes other than alpha, numeric, symbol, and space showed here as examples may be defined.

Then, the detection unit 124 calculates the similarity between the profile 14 and the data of the combinations of paths and keys corresponding to the character class series "(alpha, numeric, symbol, alpha)" and "(alpha, symbol, numeric, symbol, alpha, symbol, space, alpha, space, symbol, numeric, symbol, numeric)", which are from the analysis subject data 201, to detect an attack.

The save unit 125 saves, in the profile 14, for example, "(alpha, symbol, alpha)" as a character class series having a valid status among the character class series corresponding to the path "index.php" and the key "file" of the URL included in the learning data 202.

Processings of the calculation unit 126 and the update unit 127 will be described. First, for each of the combinations of the predetermined identification information and the character class series included in the requests, the calculation unit 126 calculates a score for update which becomes higher as the number of times of appearance of the combination is increased and becomes higher as the appearance of the combination is continued. In the present embodiment, the calculation unit 126 calculates the score for update so that the more the appearance of the combination continues in a predetermined period, the higher the score becomes. Herein, the score for update calculated by the calculation unit 126 is the above described appearance frequency used in the update of the profile 14.

A calculating processing by the calculation unit 126 will be described by using FIG. 3. FIG. 3 is a diagram for describing the calculating processing of the learning device according to the first embodiment. In the example of FIG. 3, the calculation unit 126 calculates a correction value of the number of times of appearance as the score for update.

As illustrated in FIG. 3, first, based on the character class series generated by the generation unit 121, the calculation unit 126 adds up the number of times of appearance of each of the combinations of the paths, the parameter keys, and the character class series for each of predetermined time blocks of one day.

FIG. 3 illustrates that, for example, a combination A appears 0 time during 0:00 to 4:00, 5 times during 4:00 to 8:00, 45 times during 8:00 to 12:00, 30 times during 12:00 to 16:00, 10 times during 16:00 to 20:00, and 0 time during 20:00 to 24:00.

Then, for each of the combinations, the calculation unit 126 calculates, as the correction value of the number of times of appearance, the value obtained by multiplying the total number of the numbers of times of appearance in the time blocks by the ratio of the number of the blocks in which this combination has appeared to the total number of the blocks. For example, the calculation unit 126 calculates the correction value of the number of times of appearance of the combination A as 90×4/6=60. Similarly, the calculation unit 126 calculates the correction value of the number of times of appearance of a combination B as 120×1/6=20.

Therefore, in the present embodiment, the larger the number of times of appearance of the combination, the larger the correction value of the number of times of appearance becomes. Furthermore, in the present embodiment, the more the appearance of the combination continues in one day, the larger the correction value of the number of times of appearance becomes.

Also, in the example of FIG. 3, the combination B has a larger number of times of appearance compared with the combination A, but the combination A has higher continuity. Therefore, the final score of the combination A is higher than that of the combination B.

Based on the score for update, the update unit 127 updates the profile of each combination for determining whether the request is an attack or not. In the present embodiment, the update unit 127 updates the profile 14 by using the correction value of the number of times of appearance calculated by the calculation unit 126.

Figure 4:
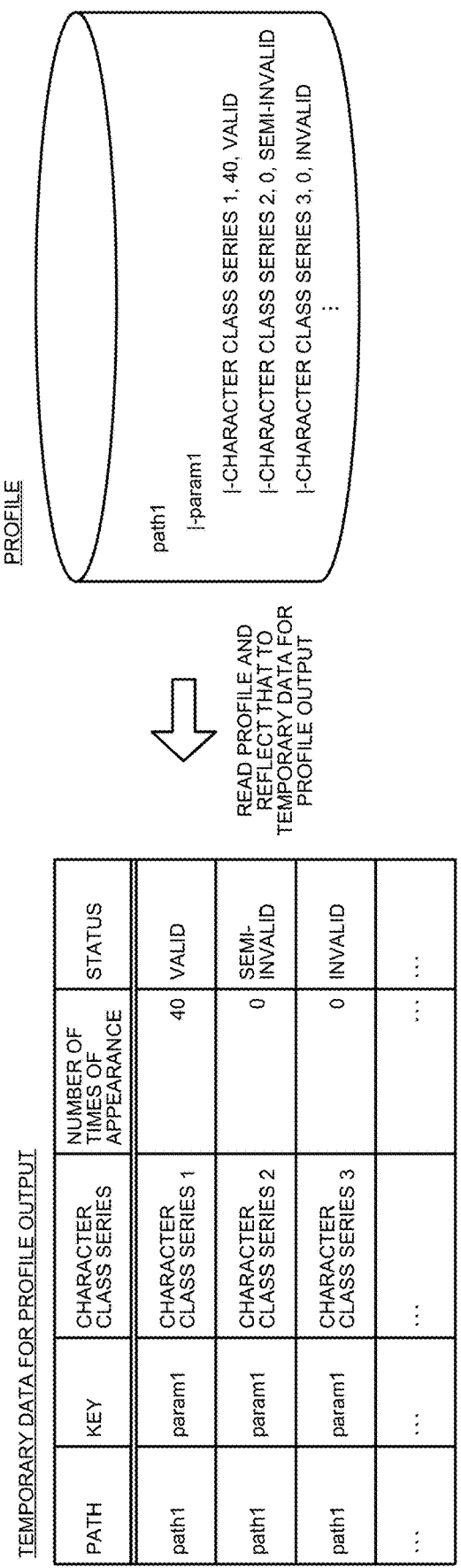
FIG. 4 is a diagram illustrating an example of temporary data for profile output according to the first embodiment.

First, the update unit 127 reads the profile 14 and initializes temporary data for profile output. FIG. 4 is a diagram illustrating an example of the temporary data for profile output according to the first embodiment. As illustrated in FIG. 4, the update unit 127 carries out initialization by reflecting the profile 14 to the temporary data for profile output.

Figure 5:
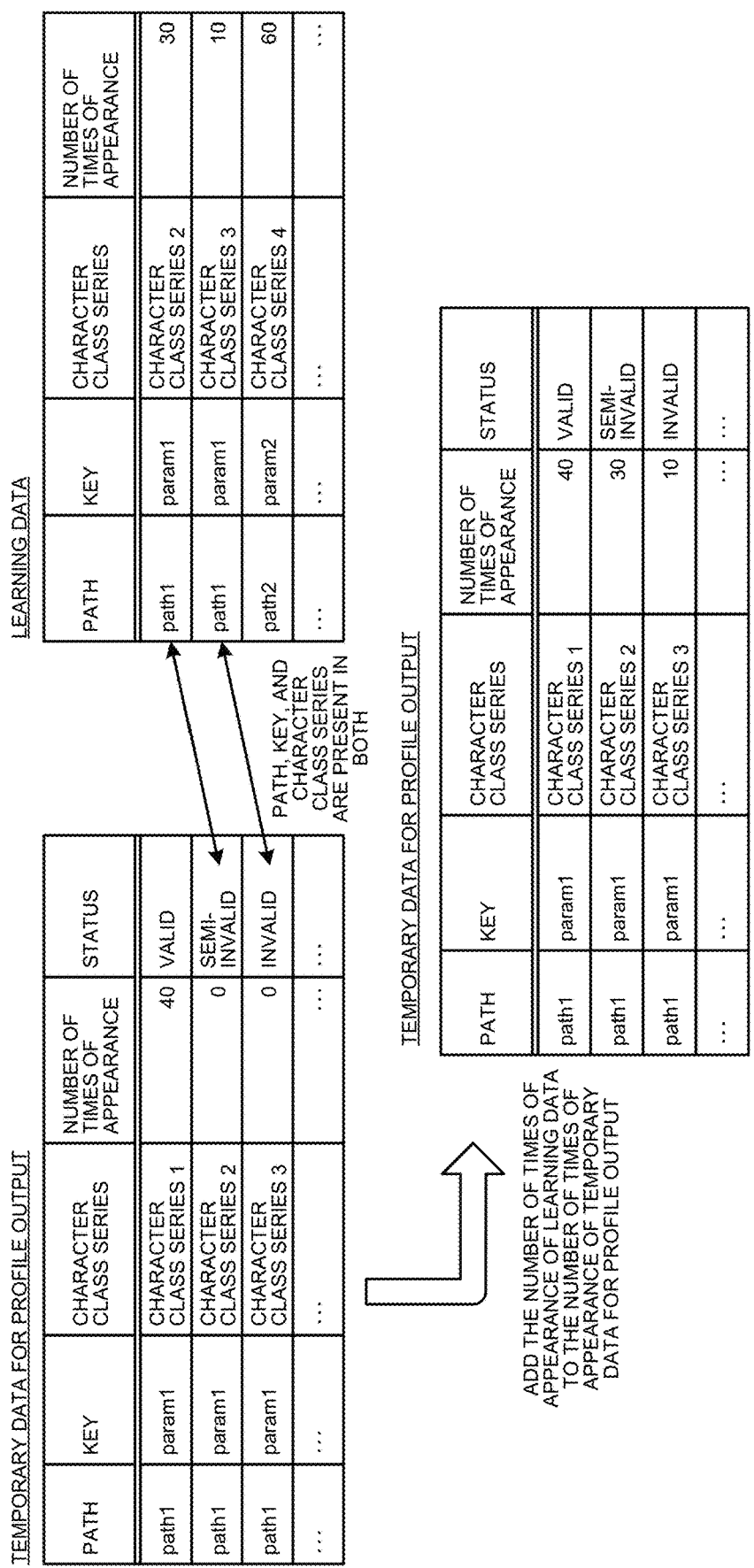
FIG. 5 is a diagram for describing an updating processing of a profile according to the first embodiment.

Then, the update unit 127 updates the temporary data for profile output by using the correction value of the number of times of appearance calculated by the calculation unit 126. Updating processings of the profile 14 will be described by using FIG. 5, FIG. 6, and FIG. 7. FIG. 5, FIG. 6, and FIG. 7 are diagrams for describing updating processings of the profile according to the first embodiment.

As illustrated in FIG. 5, if a path, a parameter key, and a character string class are present in the temporary data for profile output, the update unit 127 adds the correction value of the number of times of appearance calculated by the calculation unit 126 to the number of times of appearance of the temporary data for profile output corresponding to this combination. For example, since a combination having a path "path1", a parameter key "param1", and a character class series "character class series 2" is present in the temporary data for profile output, the update unit 127 adds a correction value 30 of the number of times of appearance calculated by the calculation unit 126 to the number of times of appearance 0 of this combination.

On the other hand, as illustrated in FIG. 6, if a path, a parameter key, and a character string class are not present in the temporary data for profile output, the update unit 127 adds a record corresponding to this combination to the temporary data for profile output. Note that the status of the added record remains unset. For example, since a combination having a path "path2", a parameter key "param2", and a character class series "character class series 4" is not present in the temporary data for profile output, the update unit 127 adds a record corresponding to this combination to the temporary data for profile output.

Herein, in the present embodiment, "valid", "semi-invalid", "invalid", and unset are present as statuses in the profile 14. The detection unit 124 carries out detection by using the profile 14 having the status "valid".

Herein, the update unit 127 updates the status and the number of times of appearance of the temporary data for profile output in accordance with following rules.

(Rule 1-1)

If the status before update is "valid", the status remains "valid".

(Rule 1-2)

If the status before update is "semi-invalid" and the number of times of appearance is equal to or higher than a threshold value, the status is updated to "valid".

(Rule 1-3)

If the status before update is "semi-invalid" and the number of times of appearance is less than the threshold value, the status remains "semi-invalid", and the number of times of appearance is updated to 0.

(Rule 1-4)

If the status before update is "invalid" and the number of times of appearance is equal to or higher than the threshold value, the status is updated to "semi-invalid", and the number of times of appearance is updated to 0.

(Rule 1-5)

If the status before update is "invalid" and the number of times of appearance is less than the threshold value, the status remains "invalid", and the number of times of appearance is updated to 0.

(Rule 1-6)

If the status before update is unset, the status is changed to "invalid", and the number of times of appearance is updated to 0.

For example, if the threshold value is 30, the update unit 127 updates the status as illustrated in FIG. 7. In the example of FIG. 7, since a combination having a path "path1", a parameter key "param1", and a character class series "character class series 1" has "valid" as the status before update, the update unit 127 maintains the status of the combination "valid". Also, since a combination having a path "path1", a parameter key "param1", and a character class series "character class series 2" has "semi-invalid" as the status before update, and the number of times of appearance thereof is equal to or higher than the threshold value. Therefore, the update unit 127 updates the status of this combination to "valid".

Then, the update unit 127 updates the profile 14 with the updated temporary data for profile output. For example, the update unit 127 replaces the profile 14, which has been created from the temporary data for profile output, with the existing profile 14.

In this manner, if the value obtained by adding the score for update to the number of times of appearance included in the profile 14 is equal to or higher than the threshold value, the update unit 127 gradually raises the status included in the profile 14. Furthermore, if the status is equal to or less than a predetermined level, the update unit 127 updates the number of times of appearance to 0 and replaces the number of times of appearance of the existing profile 14 with that.

Processing of First Embodiment

A flow of the calculating processing of the learning device 10 will be described by using FIG. 8. FIG. 8 is a flow chart illustrating the flow of the calculating processing of the learning device according to the first embodiment. As illustrated in FIG. 8, first, the calculation unit 126 acquires input data (step S101). Herein, the input data acquired by the calculation unit 126 is combinations of paths, parameter keys, and character class series.

Then, the calculation unit 126 adds up the numbers of times of appearances (step S102). Herein, the calculation unit 126 calculates the correction value of the number of times of appearance based on the added up number of times of appearance (step S103). Then, the calculation unit 126 outputs processing result data (step S104). Specifically, the calculation unit 126 passes the calculation result to the update unit 127.

Figure 9:
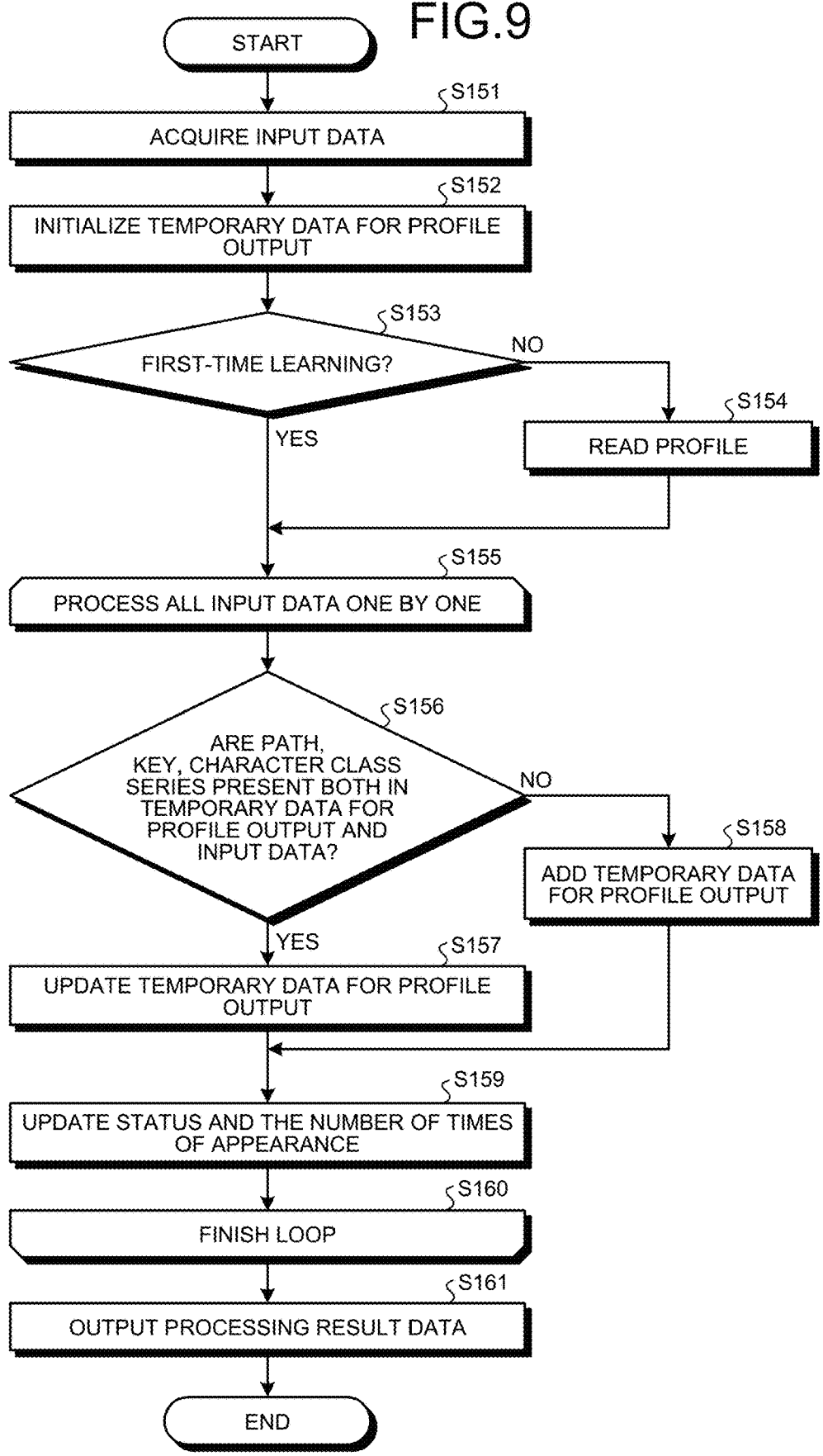
FIG. 9 is a flow chart illustrating a flow of an updating processing of the learning device according to the first embodiment.

A flow of the updating processing of the learning device 10 will be described by using FIG. 9. FIG. 9 is a flow chart illustrating the flow of the updating processing of the learning device according to the first embodiment. As illustrated in FIG. 9, first, the update unit 127 acquires input data (step S151). Herein, the input data acquired by the update unit 127 is the correction value of the number of times of appearance of each combination of the path, the parameter key, and the character class series calculated by the calculation unit 126.

Then, the update unit 127 initializes the temporary data for profile output (step S152). Herein, if it is not first-time learning (step S153, No), the update unit 127 reads the profile 14 (step S154) since the profile 14 has already been created. At this point of time, if it is first-time learning (step S153, Yes) or if it is not first-time learning (step S153, No), the profile 14 has been reflected to the temporary data for profile output.

Hereafter, the update unit 127 processes the input data one by one in a loop (step S155). If the combination of the path, the parameter key, and the character class series of the input data is present in the temporary data for profile output (step S156, Yes), the update unit 127 updates the record of the temporary data for profile output (step S157). On the other hand, if the combination of the path, the parameter key, and the character class series of the input data is not present in the temporary data for profile output (step S156, No), the update unit 127 adds the record to the temporary data for profile output (step S158).

Then, the update unit 127 updates the status and the number of times of appearance of the temporary data for profile output (step S159). Specifically, the update unit 127 updates the status and the number of times of appearance in accordance with the rule 1-1 to the rule 1-6 described above. When the updating processing is finished for all of the input data, the update unit 127 finishes the loop (step S160). Then, the update unit 127 outputs processing result data (step S161). Specifically, the update unit 127 updates the profile 14 by using the temporary data for profile output.

Effects of First Embodiment

The learning device 10 generates a character class series abstracting the structure of a predetermined character string included in each of requests to the server which have been generated in a predetermined period. Also, for each of the combinations of the predetermined identification information and the character class series included in the requests, the learning device 10 calculates a score for update which becomes higher as the number of times of appearance of the combination is increased and becomes higher as the appearance of the combination is continued. Based on the score for update, the learning device 10 updates the profile 14 of each combination for determining whether the request is an attack or not. In this manner, in the present embodiment, learning of the profile is carried out in consideration of continuity in addition to the simple number of times of appearance of patterns. Therefore, learning of the profile for detecting attacks can be appropriately carried out.

The learning device 10 can calculate the score for update so that the more the appearance of the combination continues in a predetermined period, the higher the score becomes. In this manner, in the present embodiment, the continuity can be calculated in the period. Therefore, the learning taking the cycle of appearance of patterns into consideration can be carried out.

If the value obtained by adding the score for update to the number of times of appearance included in the profile 14 is equal to or higher than the threshold value, the update unit 127 gradually raises the status included in the profile 14. Furthermore, if the status is equal to or less than a predetermined level, the update unit 127 updates the number of times of appearance to 0 and replaces the number of times of appearance of the existing profile 14 with that. By virtue of this, the learning device 10 can prevent the status from being rapidly changed.

Second Embodiment

In the first embodiment, the learning device 10 adds up the number of times of appearance of each combination of the path, the parameter key, and the character class series for each of predetermined time blocks in a predetermined period (for example, one day) and calculates the score for update to update the profile 14. On the other hand, in a second embodiment, the learning device 10 calculates the number of times of appearance of each combination of the path, the parameter key, and the character class series and calculates a score for update based on the number of the predetermined periods in which each combination appears to update the profile 14.

The learning device 10 of the second embodiment has a configuration similar to the case of the first embodiment. However, in the second embodiment, some of processing units of the learning device 10 carry out the processings different from those of the first embodiment. Regarding the processing units which carry out the processings similar to those of the first embodiment in the second embodiment, description will be omitted.

Figure 10:
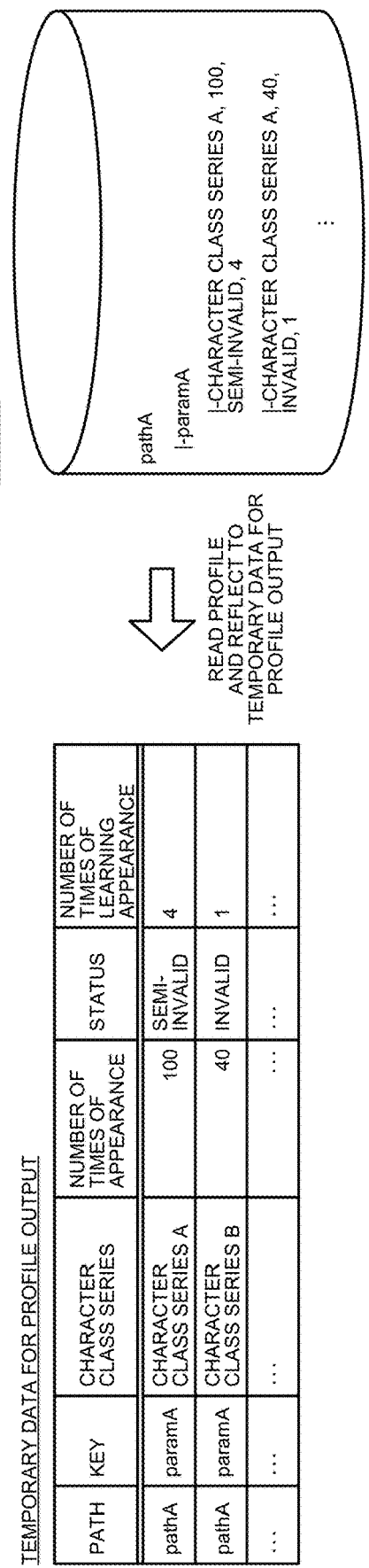
FIG. 10 is a diagram illustrating an example of temporary data for profile output according to a second embodiment.

First, the update unit 127 reads the profile 14 and initializes temporary data for profile output. FIG. 10 is a diagram illustrating an example of the temporary data for profile output according to the second embodiment. As illustrated in FIG. 10, the update unit 127 carries out initialization by reflecting the profile 14 to the temporary data for profile output.

Herein, in the second embodiment, the profile 14 includes the number of times of appearance learning. The number of times of appearance learning is the number of times that learning has been carried out. In other words, the number of times of appearance learning can be also described as the number of times that update has been carried out after each record is added. For example, if the learning data 202 is input to the learning device 10 once a day, and the number of times of appearance learning of the record of the profile 14 which has been updated every time can be said to be the number of the days in which learning is carried out.

Figure 11:
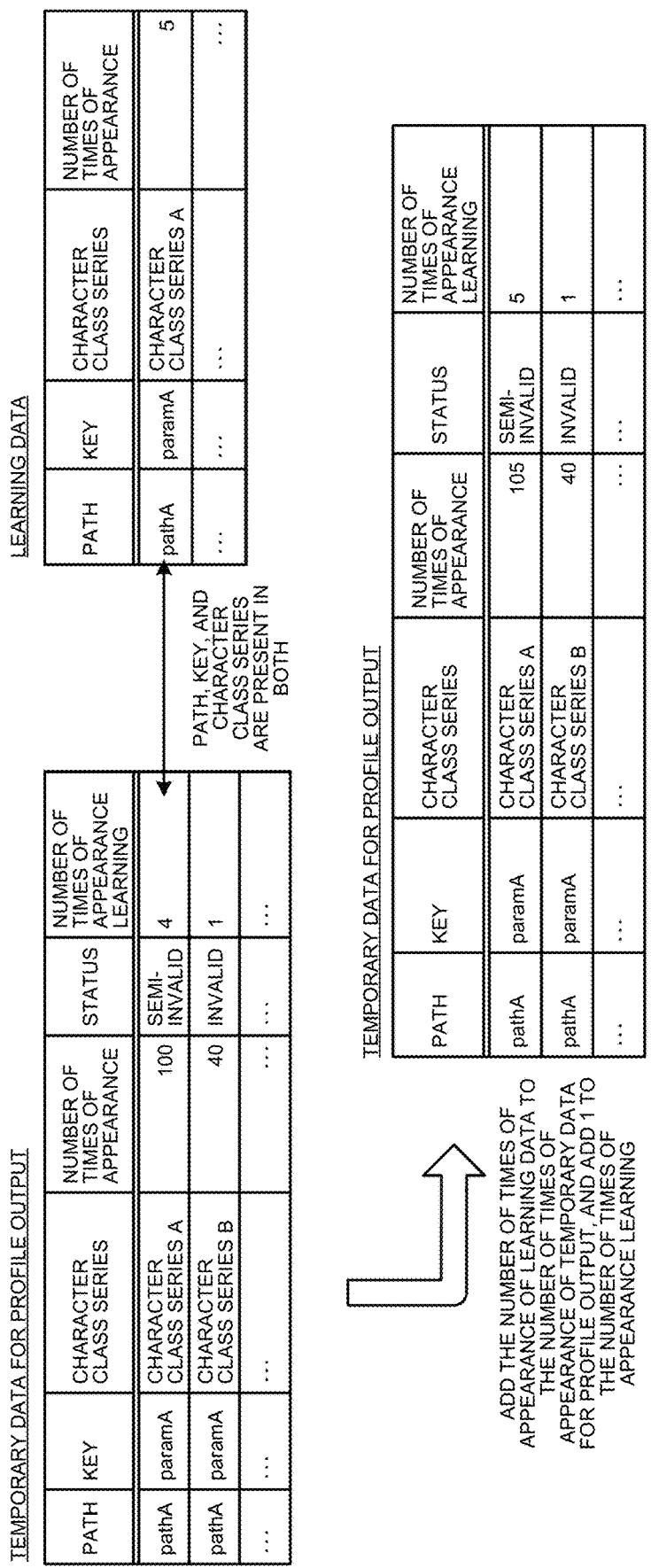
FIG. 11 is a diagram for describing an updating processing of the profile according to the second embodiment.
Figure 12:
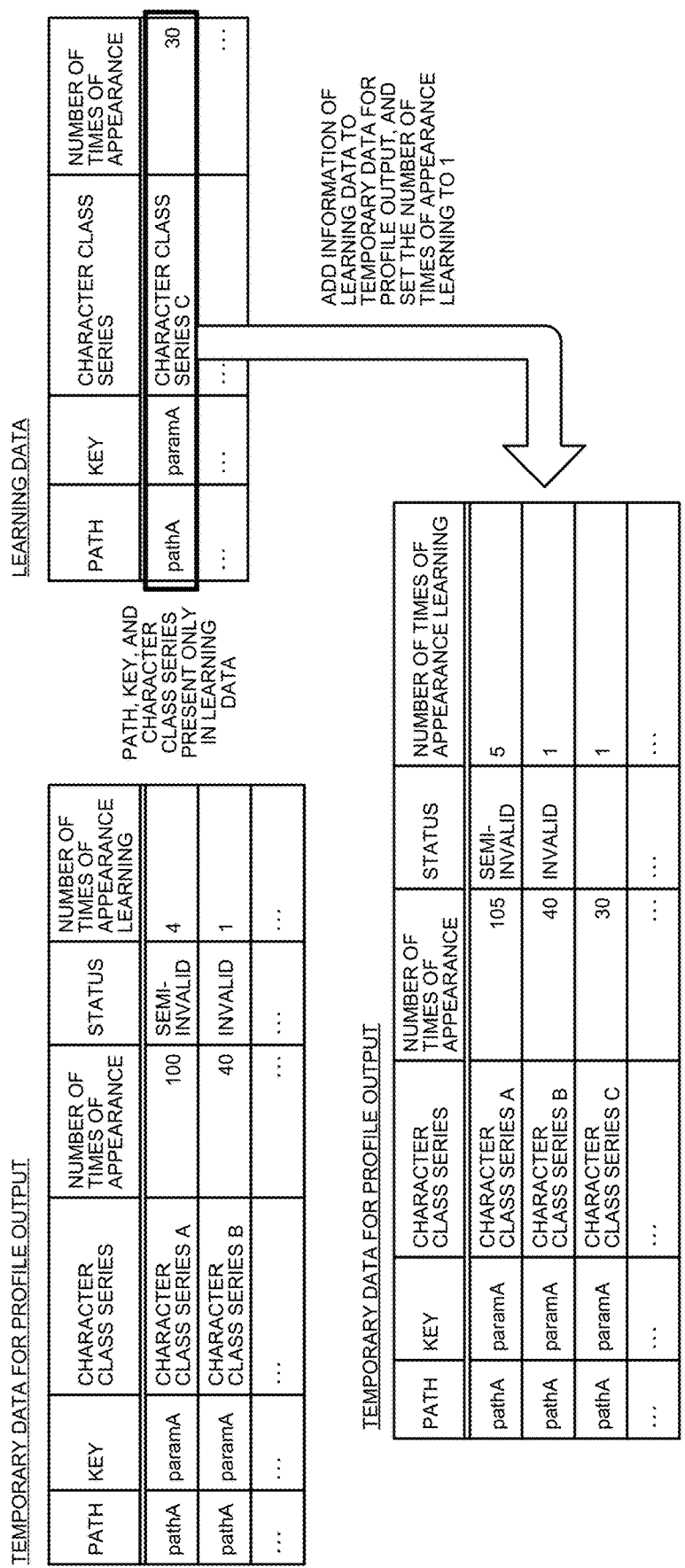
FIG. 12 is a diagram for describing an updating processing of the profile according to the second embodiment.
Figure 13:
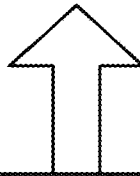
FIG. 13 is a diagram for describing an updating processing of the profile according to the second embodiment.

Then, the update unit 127 updates the temporary data for profile output by using the number of times of appearance of each combination of the path, the parameter key, and the character class series based on the character class series generated by the generation unit 121. Updating processings of the profile 14 will be described by using FIG. 11, FIG. 12, and FIG. 13. FIG. 11, FIG. 12, and FIG. 13 are diagrams for describing the updating processings of the profile according to the second embodiment.

As illustrated in FIG. 11, if a path, a parameter key, and a character string class are present in the temporary data for profile output, the update unit 127 adds the number of times of appearance, which has been received from the generation unit 121, to the number of times of appearance of the temporary data for profile output corresponding to this combination and adds 1 to the number of times of appearance learning of the temporary data for profile output. For example, since a combination having a path "pathA", a parameter key "paramA", and a character class series "character class series A" is present in the temporary data for profile output, the update unit 127 adds the number of times of appearance 5, which has been received from the generation unit 121, to the number of times of appearance 100 of this combination and adds 1 to the number of times of appearance learning 4.

On the other hand, as illustrated in FIG. 12, if a path, a parameter key, and a character string class are not present in the temporary data for profile output, the update unit 127 adds a record corresponding to this combination to the temporary data for profile output and sets the number of times of appearance learning to 1. Note that the status of the added record remains unset. For example, since a combination having a path "pathA", a parameter key "paramA", and a character class series "character class series C" is not present in the temporary data for profile output, the update unit 127 adds a record corresponding to this combination to the temporary data for profile output and sets the number of times of appearance learning to 1.

Herein, the calculation unit 126 calculates the score for update so that the larger the number of the periods in which the combination has appeared, the higher the score becomes. Specifically, the calculation unit 126 corrects the number of times of appearance of the temporary data for profile output depending on the number of times of appearance learning.

A calculating process by the calculation unit 126 will be described by using FIG. 13. FIG. 13 is a diagram for describing the calculating processing of a learning device according to the second embodiment. In the example of FIG. 13, the calculation unit 126 calculates the corrected number of times of appearance as the score for update.

Herein, the calculation unit 126 calculates the corrected number of times of appearance in accordance with following rules. Also, a threshold value of the number of times of learning is determined in advance, and, if the number of times of learning does not exceed the threshold value, the calculation unit 126 does not carry out correction.

(Rule 2-1)

If the status before update is "valid", the number of times of appearance is used as the corrected number of times of appearance without change.

(Rule 2-2)

If the status before update is not "valid", the value obtained by multiplying the number of times of appearance by the ratio of the number of times of appearance learning to the value, which is obtained by adding 1 to the threshold value of the number of times of learning, as the corrected number of times of appearance.

For example, if the threshold value of the number of times of learning is 6, the calculation unit 126 updates the status as illustrated in FIG. 13. In the example of FIG. 7, since the status of a combination having a path "pathA", a parameter key "paramA", and a character class series "character class series A" is not "valid", the calculation unit 126 calculates the corrected number of times of appearance as 105×(5/(6+1))=75.

At this point, the update unit 127 updates the status and the number of times of appearance of the temporary data for profile output. Herein, like the first embodiment, the update unit 127 updates the status and the number of times of appearance in accordance with the rule 1-1 to the rule 1-6 described above. Note that the number of times of appearance updated in this process is the corrected number of times of appearance. Then, the update unit 127 updates the profile 14 with the updated temporary data for profile output. For example, the update unit 127 replaces the profile 14, which has been created from the temporary data for profile output, with the existing profile 14.

Processing of Second Embodiment

Figure 14:
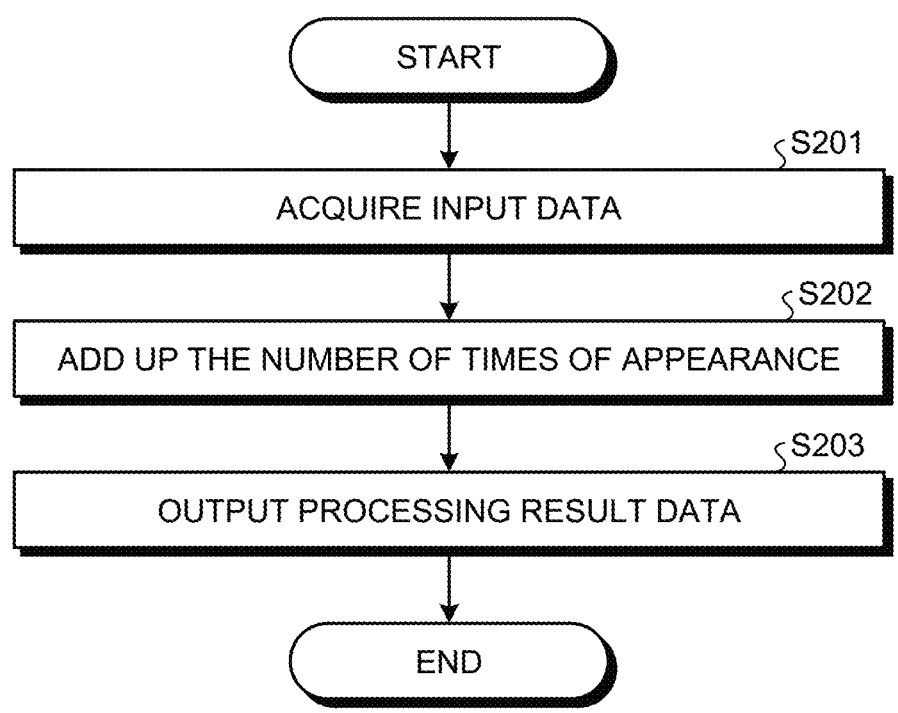
FIG. 14 is a flow chart illustrating a flow of a calculating processing of a learning device according to the second embodiment.

A flow of the calculating processing of the learning device 10 will be described by using FIG. 14. FIG. 14 is a flow chart illustrating the flow of the calculating processing of the learning device according to the second embodiment. As illustrated in FIG. 14, first, the calculation unit 126 acquires input data (step S201). Herein, the input data acquired by the calculation unit 126 is combinations of paths, parameter keys, and character class series.

Then, the calculation unit 126 adds up the numbers of times of appearance (step S202). Then, the calculation unit 126 outputs processing result data (step S203). Specifically, the calculation unit 126 passes the calculation result to the update unit 127.

Figure 15:
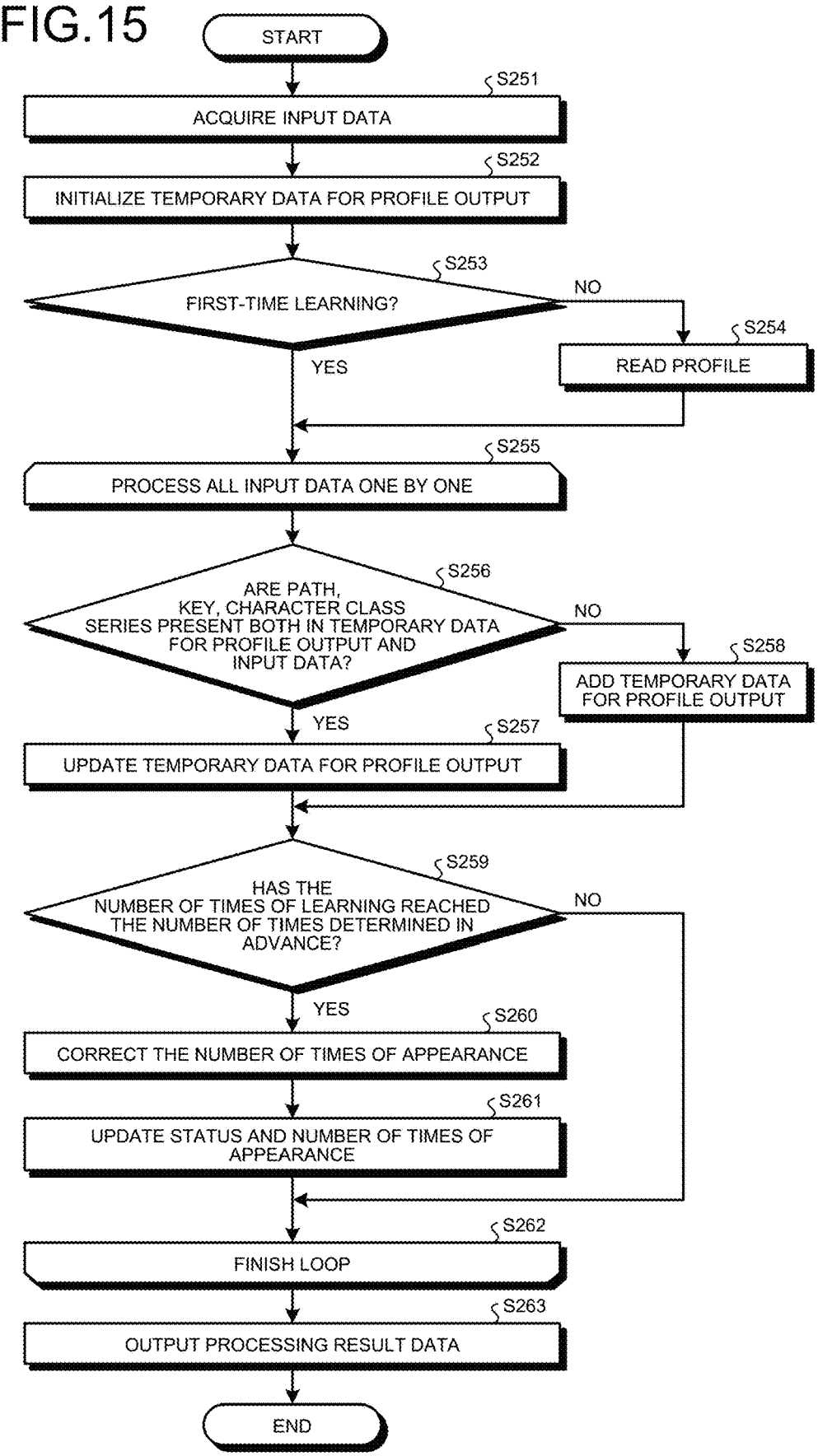
FIG. 15 is a flow chart illustrating a flow of an updating processing of the learning device according to the second embodiment.

A flow of the updating processing of the learning device 10 will be described by using FIG. 15. FIG. 15 is a flow chart illustrating the flow of the updating processing of the learning device according to the second embodiment. As illustrated in FIG. 15, first, the update unit 127 acquires input data (step S251). Herein, the input data acquired by the update unit 127 is the number of times of appearance of each combination of the path, the parameter key, and the character class series received from the calculation unit 126.

Then, the update unit 127 initializes the temporary data for profile output (step S252). Herein, if it is not first-time learning (step S253, No), the update unit 127 reads the profile 14 (step S254) since the profile 14 has already been created. At this point of time, if it is first-time learning (step S253, Yes) or if it is not first-time learning (step S253, No), the profile 14 has been reflected to the temporary data for profile output.

Hereafter, the update unit 127 processes the input data one by one in a loop (step S255). If the combination of the path, the parameter key, and the character class series of the input data is present in the temporary data for profile output (step S256, Yes), the update unit 127 updates the record of the temporary data for profile output (step S257). On the other hand, if the combination of the path, the parameter key, and the character class series of the input data is not present in the temporary data for profile output (step S256, No), the update unit 127 adds the record to the temporary data for profile output (step S258).

Then, if the number of times of learning has reached a predetermined number of times (step S259, Yes), the calculation unit 126 corrects the number of times of appearance of the temporary data for profile output based on the number of times of appearance learning (step S260). Then, the update unit 127 updates the status and the number of times of appearance of the temporary data for profile output (step S261). Specifically, like the first embodiment, the update unit 127 updates the status and the number of times of appearance in accordance with the rule 1-1 to the rule 1-6 described above. If the number of times of learning has not reached the predetermined number of times (step S259, No), the update unit 127 proceeds to a next loop.

When the updating processing is finished for all of the input data, the update unit 127 finishes the loop (step S262). Then, the update unit 127 outputs processing result data (step S263). Specifically, the update unit 127 updates the profile 14 by using the temporary data for profile output.

Effects of Second Embodiment

The calculation unit 126 calculates the score for update so that the larger the number of the periods in which the combination has appeared, the higher the score becomes. By virtue of this, the learning device 10 can update the profile by considering that the requests which have continuously appeared for a long period of time are more normal.

Third Embodiment

Hereinabove, the case in which the learning device 10 updates the status based on the number of times of appearance and the status before update has been described. On the other hand, update of the status may be carried out based on the last update date of the profile 14. In a third embodiment, a case in which the learning device 10 carries out update of the status based on the last update date of the profile 14 will be described.

The learning device 10 of the third embodiment has a configuration similar to the case of the first embodiment. However, in the third embodiment, some of processing units of the learning device 10 carry out the processings different from those of the first embodiment. Regarding the processing units which carry out the processings similar to those of the first embodiment in the third embodiment, description will be omitted.

Figure 16:
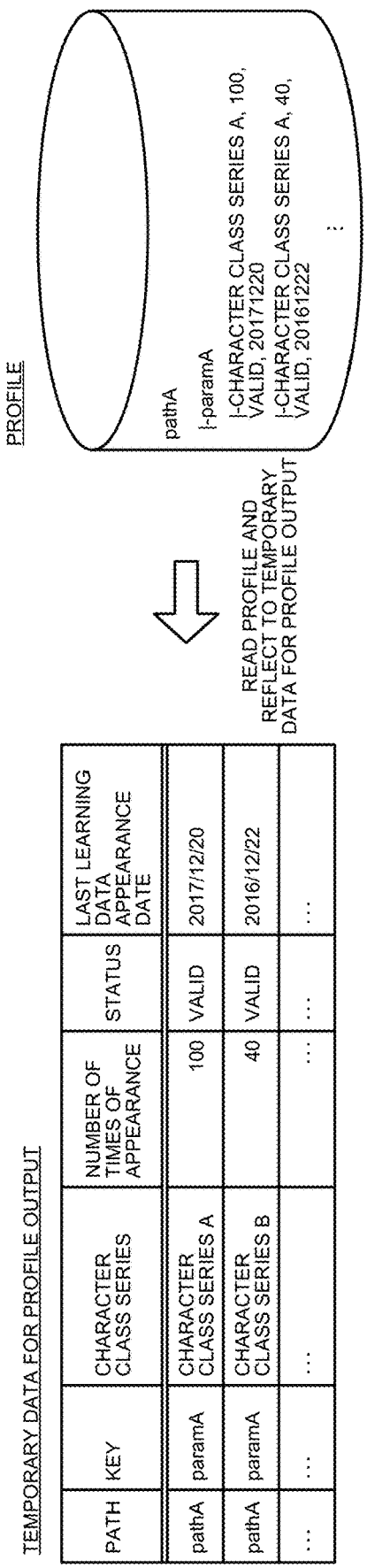
FIG. 16 is a diagram illustrating an example of temporary data for profile output according to a third embodiment.

First, the update unit 127 reads the profile 14 and initializes temporary data for profile output. FIG. 16 is a diagram illustrating an example of the temporary data for profile output according to the third embodiment. As illustrated in FIG. 16, the update unit 127 carries out initialization by reflecting the profile 14 to the temporary data for profile output. Herein, in the third embodiment, the profile 14 includes the last learning data appearance date. The last learning data appearance date is the time and date when the record is updated the last time.

Figure 17:
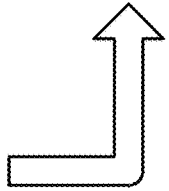
FIG. 17 is a diagram for describing an updating processing of a profile according to the third embodiment.
Figure 18:
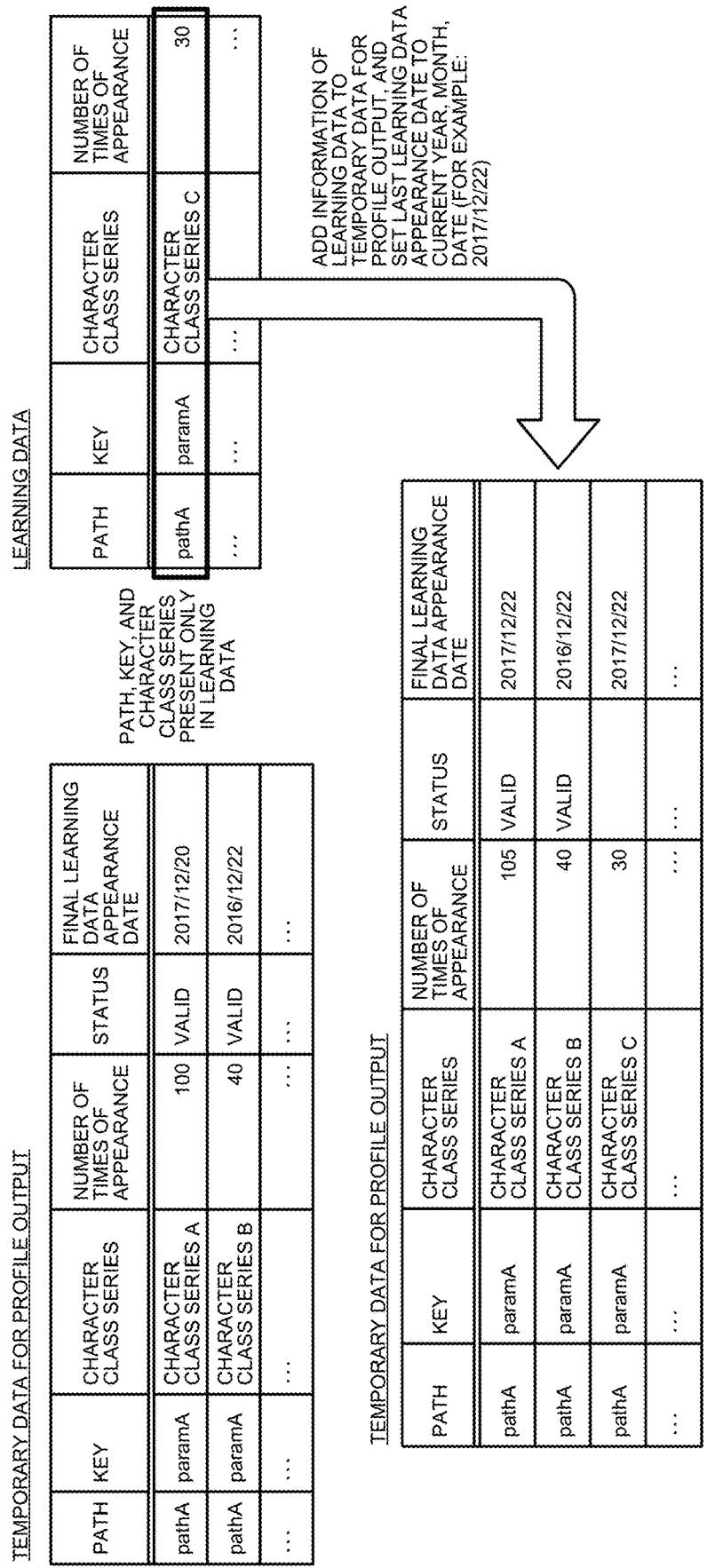
FIG. 18 is a diagram for describing an updating processing of the profile according to the third embodiment.

Then, the update unit 127 updates the temporary data for profile output by using the number of times of appearance of each combination of the path, the parameter key, and the character class series based on the character class series generated by the generation unit 121. Updating processings of the profile 14 will be described by using FIG. 17, FIG. 18, and FIG. 19. FIG. 17, FIG. 18, and FIG. 19 are diagrams for describing the updating processings of the profile according to the third embodiment.

As illustrated in FIG. 17, if a path, a parameter key, and a character string class are present in the temporary data for profile output, the update unit 127 adds the number of times of appearance received from the generation unit 121 to the number of times of appearance of the temporary data for profile output corresponding to this combination. Furthermore, the update unit 127 updates the last learning data appearance date to the date of update.

For example, since a combination having a path "pathA", a parameter key "paramA", and a character class series "character class series A" is present in the temporary data for profile output, the update unit 127 adds the number of times of appearance 5, which has been received from the generation unit 121, to the number of times of appearance 100 of this combination and updates the last learning data appearance date to date "2017/12/22" of the time of update.

Note that the time of update is the time and date at the point of time when the update unit 127 is carrying out the updating processing. Also, the update unit 127 may update the last learning data appearance date to, for example, the time and date on which the request of the data has been generated.

On the other hand, as illustrated in FIG. 18, if a path, a parameter key, and a character string class are not present in the temporary data for profile output, the update unit 127 adds a record corresponding to this combination to the temporary data for profile output. In this process, the update unit 127 updates the last learning data appearance date to the date of addition. Note that the status of the added record remains unset.

For example, since a combination having a path "pathA", a parameter key "paramA", and a character class series "character class series C" is not present in the temporary data for profile output, the update unit 127 adds a record corresponding to this combination to the temporary data for profile output and updates the last learning data appearance date to the date "2017/12/22" of record addition.

At this point, the update unit 127 updates the status of the temporary data for profile output as illustrated in FIG. 19. In this process, if the last learning data appearance date is in past by a predetermined number of days or more from the time of update, the update unit 127 updates the status to "invalid". Also, the update unit 127 updates the status to "invalid" and may reset the number of times of appearance to 0. In this manner, if the last update time and date of the profile 14 is in the past by the predetermined time and date, the update unit 127 invalidates the profile 14.

Furthermore, regarding the record which has not been invalidated in the update based on the above described last update time and date, the update unit 127 updates the status and the number of times of appearance in accordance with the rule 1-1 to the rule 1-6 described above like the first embodiment. Then, the update unit 127 updates the profile 14 with the updated temporary data for profile output. For example, the update unit 127 replaces the profile 14, which has been created from the temporary data for profile output, with the existing profile 14.

Effects of Third Embodiment

The calculation unit 126 invalidates the profile 14 of the combination which has not appeared for a certain period or more. By virtue of this, the learning device 10 can carry out detection without being affected by the profile 14 which is no longer valid due to elapse of time.

Other Embodiments

Figure 20:
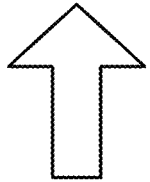
FIG. 20 is a diagram for describing an updating processing of a profile according to another embodiment.

In the above described embodiment, as the status of the profile 14, "valid", "semi-invalid", "invalid", and unset are present, but the types of the status are not limited thereto. For example, as illustrated in FIG. 20, only "valid", "invalid", and unset may be present. FIG. 20 is a diagram for describing an updating processing of a profile according to another embodiment. In this case, the update unit 127 always updates the status to "valid" if the number of times of appearance is equal to or higher than a threshold value and always updates the status to "invalid" if the number of times of appearance is less than the threshold value. Also, multiple levels of status types such as "valid", "first level semi-invalid", "second level semi-invalid", "invalid", and unset may be further present.

Figure 21:
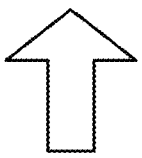
FIG. 21 is a diagram for describing an updating processing of a profile according to another embodiment.

Also, if a combination of identification information and a character class series is included in a list set in advance, the update unit 127 invalidates the profile 14. For example, as illustrated in FIG. 21, if a path, a parameter key, and a character class series are those on a list of character classes excluded from learning subjects, the update unit 127 always updates the status to "invalid". Note that the path, the parameter key, and the character class series are examples of identification information. For example, the list of character classes excluded from learning subjects is a blacklist created based on the requests which are known to be attacks.

Furthermore, regarding the record which has not been invalidated in the update based on the above described list of character classes excluded from learning subjects, the update unit 127 updates the status and the number of times of appearance in accordance with the rule 1-1 to the rule 1-6 described above like the first embodiment. Then, the update unit 127 updates the profile 14 with the updated temporary data for profile output.

Note that, in the embodiments, the profile 14 is shown in a tabular format. However, as the data storage format of the profile 14, the data may be stored by using a Javascript (registered tradename) object notation (JSON) format or a database of MySQL, PostgreSQL, or the like other than the tabular format. Also, all of the analysis subject data 201 and the learning data 202 are the data including a plurality of HTTP requests and, for example, may be access logs of Web servers or data in a JSON format of parsed or converted access logs. Also, the described processings of the calculation unit 126 and the update unit 127 may be independently used or may be used in an appropriate combination.

[Program]

As an embodiment, the learning device 10 can be implemented by installing a learning program serving as packaged software or online software, which executes the above described learning, in a desired computer. For example, an information processing device can be caused to function as the learning device 10 by executing the above described learning program by the information processing device. The information processing device referred to herein includes a personal computer of a desktop type or a laptop type. Also, other than that, for example, smartphones, mobile communication terminals such as portable phones and personal handyphone systems (PHSs), and slate terminals such as personal digital assistants (PDAs) fall within the category of the information processing device.

Also, the learning device 10 can be implemented as a learning server device which uses a terminal device used by a user as a client and provides a service, which is related to the above described learning, to the client. For example, the learning server device is implemented as a server device providing a learning service which uses a profile before update and analysis subject HTTP requests as inputs and uses an updated profile as an output. In this case, the learning server device may be implemented as a Web server or a cloud which provides a service related to the above described learning by outsourcing.

FIG. 22 is a diagram illustrating an example of a computer which executes the learning program according to the embodiment. A computer 1000 has, for example, a memory 1010 and a CPU 1020. Also, the computer 1000 has a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program of, for example, basic input output system (BIOS). The hard disk drive interface 1030 is connected to a hard disk drive 1090. The disk drive interface 1040 is connected to a disk drive 1100. For example, an attachable/detachable storage medium such as a magnetic disk or an optical disk is inserted in the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. More specifically, the program which defines the processings of the learning device 10 is implemented as the program module 1093, in which codes executable by a computer are described. The program module 1093 is stored, for example, in the hard disk drive 1090. For example, the program module 1093 for executing the processings which are similar to the functional configuration of the learning device 10 is stored in the hard disk drive 1090. Note that the hard disk drive 1090 may be replaced by an SSD.

Also, setting data used in the processings of the above described embodiments is stored as the program data 1094, for example, in the memory 1010 or in the hard disk drive 1090. Then, in accordance with needs, the CPU 1020 reads the program module 1093 and/or the program data 1094, which is stored in the memory 1010 or the hard disk drive 1090, to the RAM 1012 and executes that.

Note that the program module 1093 and the program data 1094 is not limited to be stored in the hard disk drive 1090, but may be stored, for example, in an attachable/detachable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read from the other computer by the CPU 1020 via the network interface 1070.

REFERENCE SIGNS LIST

10 LEARNING DEVICE
11 INPUT UNIT
12 CONTROL UNIT
13 DETECTION RESULT
14 PROFILE
111 ANALYSIS-SUBJECT-DATA INPUT UNIT
112 LEARNING-DATA INPUT UNIT
121 GENERATION UNIT
122 EXTRACTION UNIT
123 CONVERSION UNIT
124 DETECTION UNIT
125 SAVE UNIT
126 CALCULATION UNIT
127 UPDATE UNIT
201 ANALYSIS SUBJECT DATA
202 LEARNING DATA

The invention claimed is:

1. A learning method executed by a computer, the learning method comprising:
   generating a character class series, which is a series of each class of character string included in a request to a server generated in a predetermined period;
   calculating, for each combination of identification information and the character class series included in the request, a score for update so that the score is increased as a number of times of appearance of the combination is increased and that the score is increased corresponding to a duration of appearance of the combination; and
   updating a profile based on the score, the profile including the number of times of appearance of each combination, and the profile is for use in determining whether the request is an attack or not, wherein
   the updating includes:
      when a value obtained by adding the score to the number of times of appearance included in the profile is equal to or higher than a threshold value, gradually raising a status included in the profile,
      when the status is equal to or less than a predetermined level, changing the number of times of appearance to be 0, and
      when the combination of the identification information and the character class series is included in a list set in advance, invalidating the profile.

2. The learning method according to claim 1, wherein in the calculating, the score is calculated to increase according to the appearance of the combination in the predetermined period.

3. The learning method according to claim 1, wherein in the calculating, the score is calculated to increase according to the number of a period in which the combination appears.

4. The learning method according to claim 1, wherein in the updating, when a last update time and a date of the profile has passed by a threshold amount of time, the profile is invalidated.

5. A learning device, comprising:
   a memory; and
   a processor coupled to the memory and configured to:
      generate a character class series, which is a series of each class of character string included in a request to a server generated in a predetermined period;
      calculate, for each combination of identification information and the character class series included in the request, a score for update so that the score is increased as a number of times of appearance of the combination is increased and that the score is increased corresponding to a duration of appearance of the combination; and
      update a profile based on the score, the profile including the number of times of appearance of each combination, and the profile is for use in determining whether the request is an attack or not, wherein
   to update the profile, the processor is configured to:
      when a value obtained by adding the score to the number of times of appearance included in the profile is equal to or higher than a threshold value, gradually raise a status included in the profile,
      when the status is equal to or less than a predetermined level, change the number of times of appearance to be 0, and
      when the combination of the identification information and the character class series is included in a list set in advance, invalidate the profile.

6. A non-transitory computer-readable recording medium having stored therein a program, for learning, that causes a computer to execute a process comprising:

generating a character class series, which is a series of each class of character string included in a request to a server generated in a predetermined period;

calculating, for each combination of identification information and the character class series included in the request, a score for update so that the score is increased as a number of times of appearance of the combination is increased and that the score is increased corresponding to a duration of appearance of the combination; and updating a profile based on the score, the profile including the number of times of appearance of each combination, and the profile is for use in determining whether the request is an attack or not, wherein the updating includes:
when a value obtained by adding the score to the number of times of appearance included in the profile is equal to or higher than a threshold value, gradually raising a status included in the profile, when the status is equal to or less than a predetermined level, changing the number of times of appearance to be 0, and when the combination of the identification information and the character class series is included in a list set in advance, invalidating the profile.

* * * * *